United States Patent
Lee et al.

(10) Patent No.: US 7,659,650 B2
(45) Date of Patent: Feb. 9, 2010

(54) SELF-MAGNETIZING MOTOR AND COMPRESSOR HAVING THE SAME

(75) Inventors: Sung-Ho Lee, Seoul (KR); Jae-Hak Choi, Seoul (KR); Jin-Soo Park, Seoul (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 11/898,389

(22) Filed: Sep. 12, 2007

(65) Prior Publication Data

US 2008/0218025 A1 Sep. 11, 2008

(30) Foreign Application Priority Data

Mar. 5, 2007 (KR) ...................... 10-2007-0021664

(51) Int. Cl.
*H02K 21/12* (2006.01)
(52) U.S. Cl. .................................. 310/156.81; 310/211
(58) Field of Classification Search ................. 310/211, 310/156.78, 156.79, 156.81, 156.83, 156.84
See application file for complete search history.

(56) References Cited

U.S. PATENT DOCUMENTS

| | | | | |
|---|---|---|---|---|
| 3,670,238 A | * | 6/1972 | Ronk | ........................ 363/150 |
| 4,454,438 A | * | 6/1984 | Yamashita et al. | .......... 310/162 |
| 5,523,637 A | * | 6/1996 | Miller | .................... 310/156.47 |
| 5,548,172 A | * | 8/1996 | Kliman et al. | ......... 310/156.81 |
| 5,758,709 A | * | 6/1998 | Boyd, Jr. | .................... 164/109 |
| 5,952,757 A | * | 9/1999 | Boyd, Jr. | ............... 310/156.81 |
| 6,184,606 B1 | * | 2/2001 | Pyrhonen | .................... 310/182 |
| 6,737,783 B2 | * | 5/2004 | Yanashima et al. | .......... 310/211 |
| 2005/0077801 A1 | * | 4/2005 | Han et al. | .................... 310/266 |

FOREIGN PATENT DOCUMENTS

| | | |
|---|---|---|
| KR | 10-2005-0028349 | 3/2005 |
| KR | 10-2006-0022438 | 3/2006 |
| KR | 10-0652601 | 12/2006 |
| KR | 10-0664092 | 1/2007 |

* cited by examiner

*Primary Examiner*—Dang D Le
(74) *Attorney, Agent, or Firm*—KED & Associates, LLP

(57) ABSTRACT

A self magnetizing motor and a compressor having the same is configured to require a lower starting voltage and to deliver superior performance. In the self magnetizing motor, a magnetic material on an exterior of the rotor is magnetized when power is supplied to a magnetizing unit of the stator. A plurality of conductive bars are inserted on the outer circumference of the rotor core. A spacing distance between outer portions of the conductive bars and inner circumference of the magnetizable material is longer than an air gap between the stator and the rotor. As a result, a magnetic strength of the magnetic material may be increased.

21 Claims, 6 Drawing Sheets

SELF-MAGNETIZING MOTOR AND COMPRESSOR HAVING THE SAME

The present application claims priority to Korean Patent Application No. 10-2007-0021664, filed on Mar. 5, 2007, which is herein expressly incorporated by reference in its entirety.

BACKGROUND

1. Field

The present application discloses a self magnetizing motor and a compressor having the same.

2. Background

In general, a motor is a device for converting electrical energy into kinetic energy. Motors may be divided in direct current (DC) motors and alternating current (AC) motors according to a power source to be used. AC motors include induction motors, synchronous motors and commutator motors. The induction motors may be classified into a single-phase induction motor and a three-phase induction motor.

The single-phase induction motor has a relatively simple structure. Also, it is relatively easy to obtain a single-phase power source for such a motor. As a result, single phase induction motors are widely used in all sorts of electrical devices and appliances for domestic, office, industry and architecture. The single-phase induction motor cannot start rotating using just its main coil. For this reason, in addition to the main coil, these motors include a sub coil which receives current having a phase which is approximately 90 degrees out of phase with the current supplied to the main coil. The current applied to the sub-coil generates a starting torque. The main and sub coils are wound on a stator using a predetermined winding method.

In the related art single-phase induction motor, when an AC power source is supplied to the main coil and the sub coil during the initial starting procedure, a rotating magnetic field is generated. Once the rotor begins to rotate, the current supplied to the sub coil is stopped by a current cut-off device. Current is then only supplied to the main coil. Also, as the rotor rotates, an induction current is generated in conductive bars of the rotor.

The AC current applied to the main coil generates a rotating magnetic field which rotates at a predetermined speed which depends on the physical configuration of the motor. However, in related art motors, the rotor will rotate at less than the speed of the rotating magnetic field. The difference between the rotational speed of the rotating magnetic field and the rotating speed of the rotor is typically called "slip."

BRIEF DESCRIPTION OF THE DRAWINGS

The embodiments will be described in detail with reference to the following drawings, in which like reference numerals refer to like elements, and wherein.

DETAILED DESCRIPTION

Reference will now be made in detail to preferred embodiments, examples of which are illustrated in the accompanying drawings.

Figure 1:
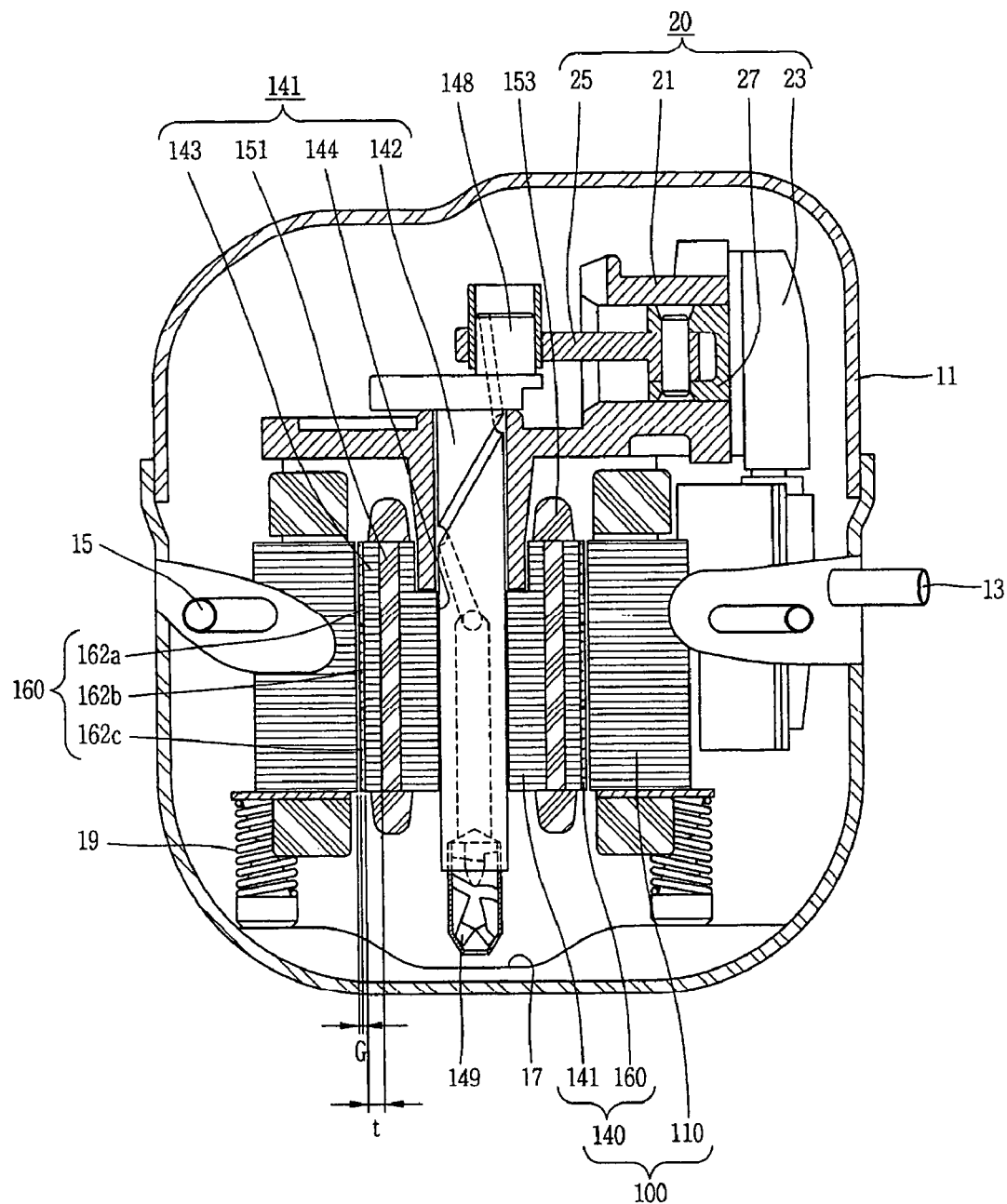
FIG. 1 is a cross-sectional view of a compressor having a self magnetizing motor.

As shown in FIG. 1, a compressor having a self-magnetizing motor may comprise a case 11; a compression portion 20 disposed inside of the case to compress a refrigerant; and the self magnetizing motor 100 providing the compression portion 20 with a driving power. The case 11 may have a closed receiving space therein, and be provided with an intake pipe 13 and a discharge pipe 15. An oil receiving portion 17 for receiving a lubricating oil may be formed at a lower portion of the inside of the case 11.

The compression portion 20 for compressing the refrigerant may be disposed at an upper portion of the case 11. The self magnetizing motor 100 may be installed below the compression portion 20 so as to provide the compression portion 20 with driving power. A plurality of support springs 19 for supporting the self magnetizing motor 100 may be provided at the lower side of the self magnetizing motor 100.

The compression portion 20 may comprise a cylinder 21 forming a compressing space for the refrigerant therein and a piston 27 reciprocatingly installed inside the cylinder 21 to compress the refrigerant. An intake muffler 23 may be installed at one side of the cylinder 21, which is to be connected to the intake pipe 13 for sucking the refrigerant. One end of a piston rod 25 may be connected to the piston 27 and the other end of the piston rod 25 may be connected to an eccentric portion formed on a rotation shaft 152 of the self magnetizing motor 100. In other embodiments, different types of compression mechanisms may be used to compress the refrigerant, such as a rotating vane type compressor.

Figure 2:
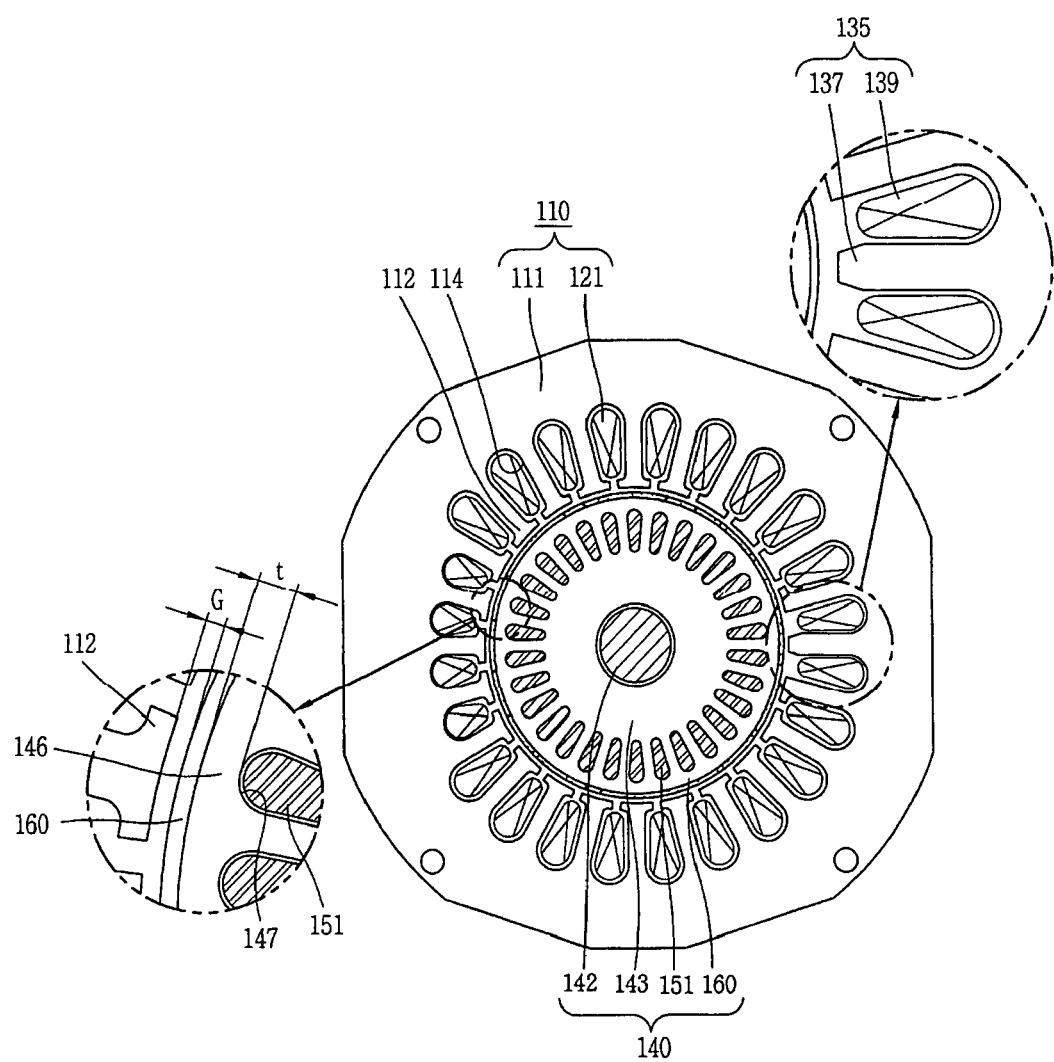
FIG. 2 is a cross-sectional view of the self magnetizing motor of the compressor in FIG. 1.
Figure 3:
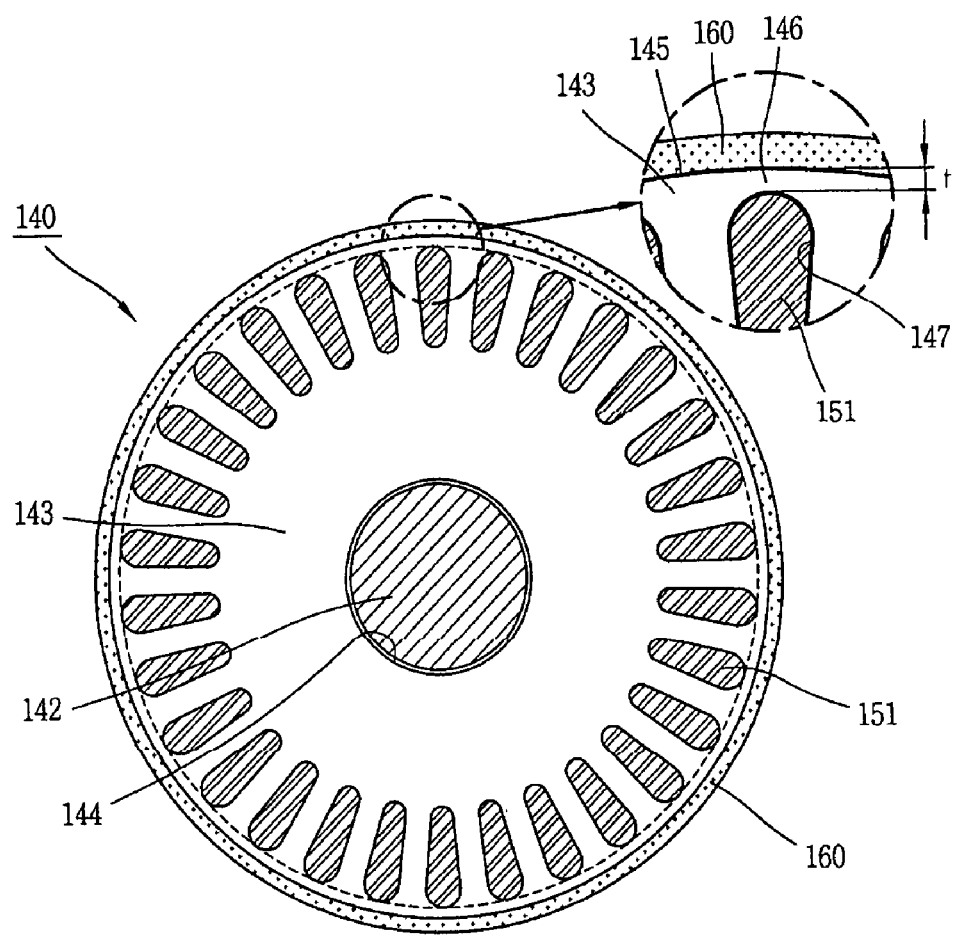
FIG. 3 is a magnified view of the rotor core shown in FIG. 2.

Meanwhile, as shown in FIGS. 1 through 3, the self magnetizing motor 100 may comprise a stator 110 with the main and sub-coils. A rotor 140 with a rotor core 143 is disposed inside of the stator 110. A magnetic material 160 is disposed on an outer circumference 145 of the rotor core 143. Conductive bars mounted in the rotor at locations spaced around the circumference 145 of the rotor core 143. As shown in FIGS. 2 and 3, a spacing distance "t" between the outer edges of the conductive bars 151 and the inner edge of the magnetic material 160 is greater than a thickness "G" of an air gap between the magnetic material 160 and the stator 110.

As shown in FIG. 2, a magnetizing unit 135 is used to magnetize the magnetic material 160 when power is supplied to the magnetizing unit 135. The stator 110 may be provided with a stator core 111 and a stator coil 121 would on the stator core 111. A cylinder receiving space may be formed inside of the stator core 111 so as to receive the rotor 140. A plurality of teeth 112 and slots 114 are alternatingly formed in an inside diameter of the stator 111. As shown in FIG. 2, a certain air gap (G) may be formed between the stator core 111 and the outer circumference of the rotor 140.

The magnetizing unit 135 includes a magnetizing pole 137 protrudingly formed between the teeth 112. A separate magnetizing coil 139 is wound on the magnetizing pole 137. The magnetizing pole extends inwards towards the magnetic material 160 on the outer circumference of the rotor.

The rotor 140 may be provided with a rotor unit 141 having a rotation shaft 142. The magnetic material 160 is formed on the exterior surface of the rotor unit 141. An oil pumping unit 149 may be provided at the lower portion of the rotation shaft 142 so as to upwardly supply oil in the oil receiving portion 17. An eccentric portion 148 for creating an eccentric movement may be formed at the upper end of the rotation shaft 142.

The rotor unit 141 may be provided with a rotor core 143 having a shaft hole 144 at the middle portion thereof. The rotation shaft 142 is mounted within the shaft hole 144. A plurality of conductive bars 151 are mounted in the rotor, and the bars are located along the outer circumference 145 of the rotor core 143. The bars are oriented so that they extend radially towards the outer circumference. End rings 153 may be formed integrally with the conductive bars 151, at both ends of the rotor core 143, respectively.

In some embodiments, insertion holes 147 may be formed in the rotor core 143 so that the conductive bars 151 can be inserted into the rotor core 143. Because the bars are spaced back from the outer circumference of the rotor, a rib 146 having predetermined thickness "t" is formed between the outer edge of the insertion hole 147 and the outer circumference 145 of the rotor core 143. Preferably, the thickness t of the rib 146 is longer than the air gap G. More preferably, the thickness t is approximately 2 to 5 times the air gap G.

In a preferred embodiment, the air gap G is 0.3 mm and the thickness t of the rib 146 is approximately 0.6 mm to 1.5 mm. The inventors have found that when the conductive bars are spaced back from the magnetic material 160 by the thickness t of the rib, an intensity of a magnetic force of the magnetic material 160 (after magnetizing of the magnetic material 160) can be better maintained. In addition, the rib helps to enhance starting characteristics and performance of the motor.

Hereinafter, with reference to FIGS. 4 and 5, changes in the efficiency and starting voltage characteristics of the motor, and changes in EMF (electromotive force) of the stator coil 121, which result from changes in the thickness t of the rib 146 will be described.

Figure 4:
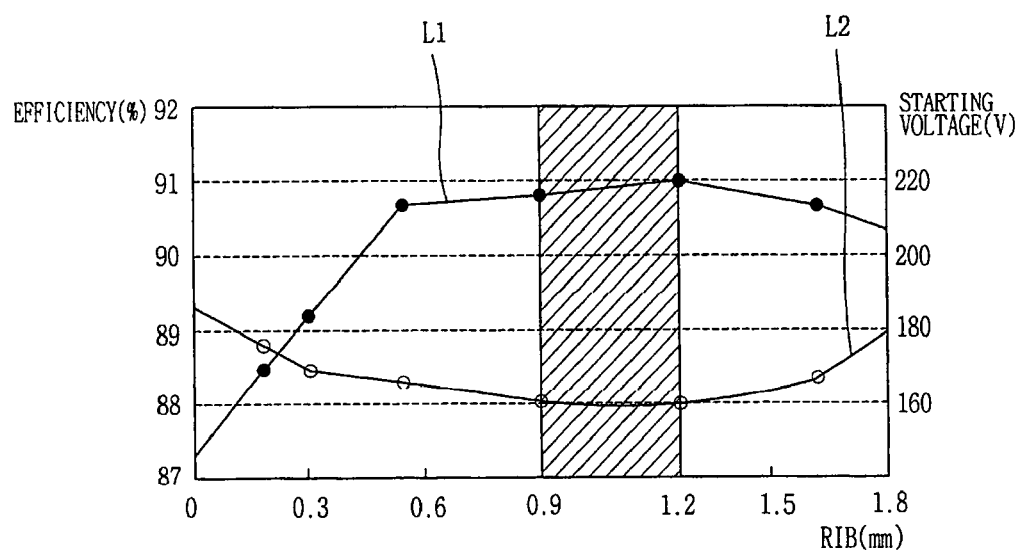
FIG. 4 is a diagram showing changes of a starting voltage and an efficiency of a motor which result from changes in the thickness of a rib of the rotor core shown in FIG. 3.

FIG. 4 shows how changes in the thickness of the rib affect the efficiency and the starting voltage of the motor. The efficiency is plotted as line L1, and the starting voltage is shown as line L2. The results shown in FIG. 4 are for a motor with an air gap G of 0.3 mm. When the thickness (t) of the rib 146 is in the range of 2 (0.6 mm) to 5 times (1.5 mm) the air gap, the starting voltage is decreased and the efficiency is increased. Particularly, in the range of three times (0.9 mm) to 4 times (1.2 mm) of the air gap (0.3 mm), the starting voltage is remarkably decreased, while, the efficiency is remarkably increased.

Figure 5:
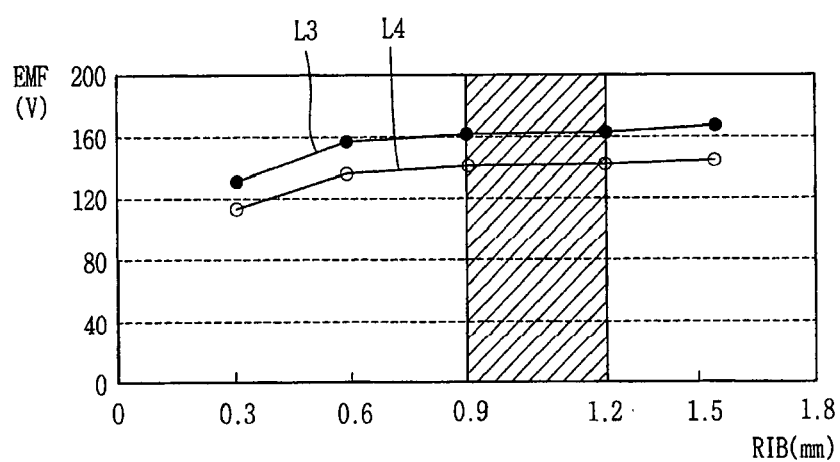
FIG. 5 shows changes of an electromotive force of a main coil and a sub coil which result from changes in a thickness of the rib of the rotor core shown in FIG. 3.

FIG. 5 shows the changes in EMF of the stator coil 121 according to changes of the thickness of the rib 146. The stator coil 121 is composed of a main coil and a sub coil, and the curved line L3 indicates changes in the EMF of the main coil and the curved line L4 indicates changes in the EMF of the sub coil. As shown, the EMF of the stator coil 121 gradually increases as the rib 146 gets thicker.

The conductive bars 151 may be formed to have an oval cross-sectional shape. The longer axis of the oval is oriented in the radial direction. This helps to offset deterioration of the starting characteristics, which may be caused by a leakage flux. When the diameter of the rotor core is 55-60 mm, one can fit 24-30 conductive bars onto the rotor. This would result in the bars each having a cross-sectional area of 20 mm$^2$ to 25 mm$^2$, for ensuring adequate induction torque.

Figure 6:
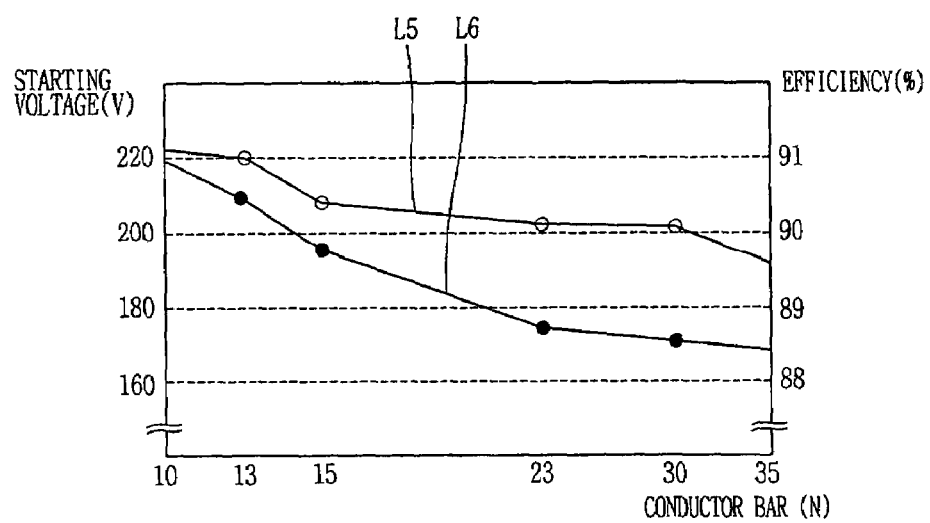
FIG. 6 shows changes of a starting voltage and an efficiency of a motor which result from changes in the number of conductive bars mounted in the rotor shown in FIG. 2.
Figure 7:
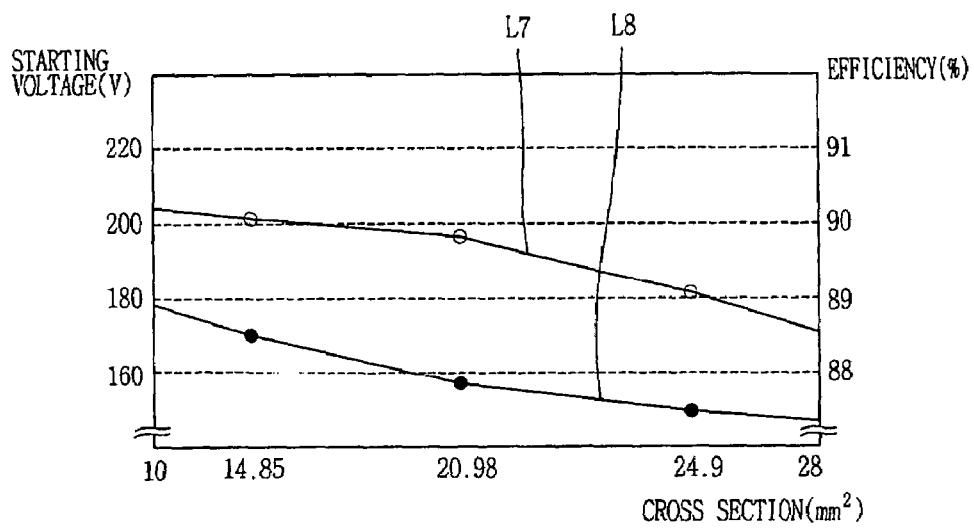
FIG. 7 shows changes of the starting voltage and the efficiency of a motor which result from changes in a cross-sectional area of the conductive bars of the rotor shown in FIG. 2.

FIGS. 6 and 7 illustrate how changes in the number of conductive bars affect the starting voltage and efficiency of the motor. As shown in FIG. 6, the efficiency L5 of the motor is slightly reduced when larger numbers of conductive bars 151 are used. However, the decrease in efficiency is slight, representing only slightly more than one percent when the number of bars changes from 10 to 35.

However, the required starting voltage L6 is remarkably decreased when additional bars are added. And the decrease in the required starting voltage is quite large compared to the reduction of the efficiency. Accordingly, it is possible to start the motor with a relatively low starting voltage when more conductive bars are used. The efficiency is only very slightly reduced while the starting voltage is greatly decreased when 24 to 30 conductive bars 151 are used in the rotor.

As shown in FIG. 7, if the cross-sectional area of the conductive bar 151 is increased, the efficiency L7 of the motor is slightly reduced. However, here again, the starting voltage L8 may be significantly reduced when the bars have a larger cross-sectional area. That is, when the cross-sectional area of each conductive bar 151 is between 20 mm$^2$ and 25 mm$^2$, the efficiency may be slightly reduced but the starting voltage may be greatly reduced. The inventors have also found that when the cross-sectional area exceeds 25 mm$^2$, the efficiency of the motor begins to deteriorate faster, and there is no corresponding benefit of a lower staring voltage. Thus, it appears that once the cross-sectional area of the bars reaches approximately 25 mm$^2$, further increases in the cross-sectional area cause a large detrimental impact on efficiency.

Figure 8:
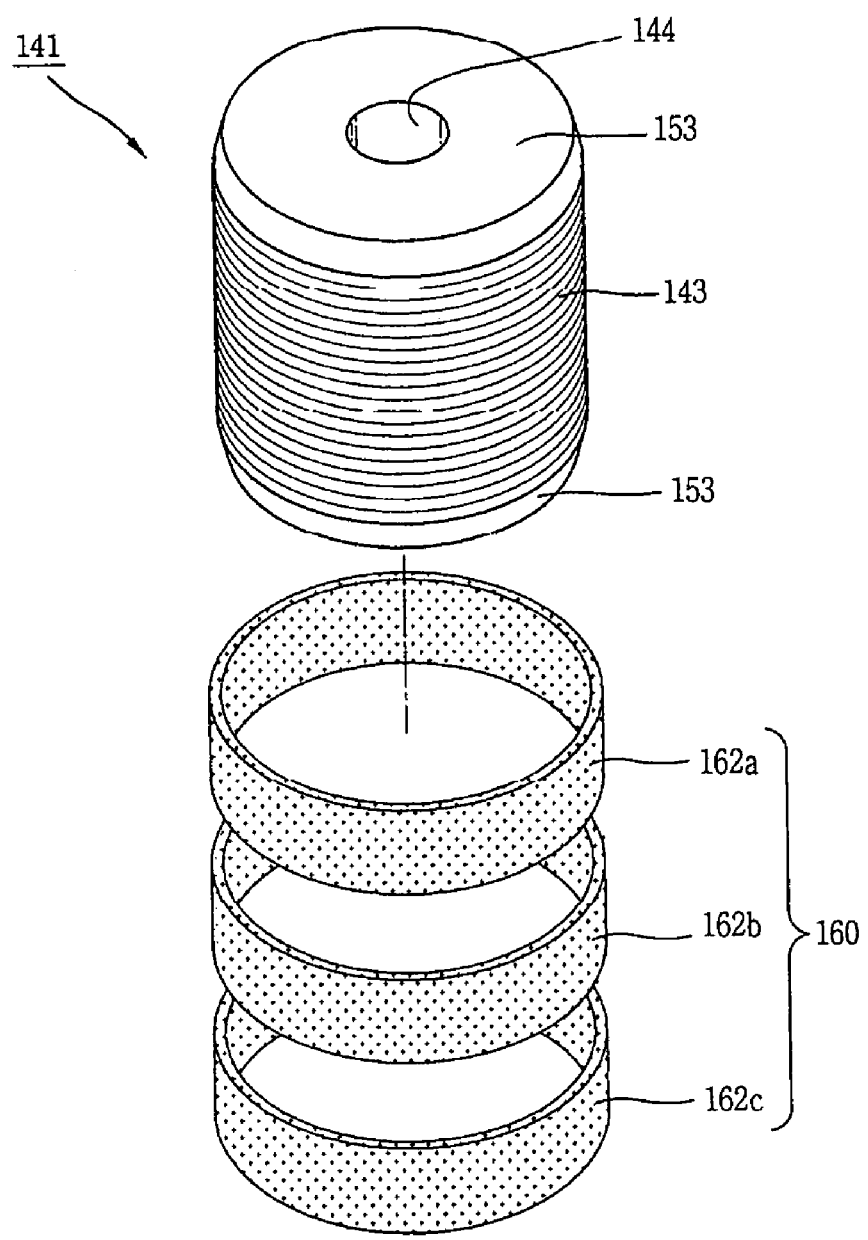
FIG. 8 is a perspective view showing how a magnetic material is mounted on a rotor as shown in FIG. 2.

As shown in FIG. 8, the magnetic material 160 may be formed of a plurality of segments 162a~162c. When the magnetic material is formed of a plurality of segments, it enhances residual magnetic flux density by increasing the density of the magnetic material 160. In addition, it is easier to control a thickness of the magnetic material when it is formed of multiple small segments. Preferably, the magnetic material 160 may be formed of 3 to 5 segments, which enhances the density of the magnetic material more than 5.9 g/cm$^3$. Further, preferably, each segment 162a~162c may be formed by using a Nd bonded magnet. This helps to facilitate the magnetization/demagnetization of the magnetic material 160.

When power is supplied to the stator coil 121 of a rotor as described above, a rotation magnetic field is formed by the stator coil 121. An induction current is then generated in the conductive bars 151 by the rotation magnetic field. In addition, the magnetic material 160 may be initially magnetized by the rotation magnetic field with an intensity weaker than that of the magnetization caused by the magnetizing unit 135. As a result of all these forces, the rotor may be rotated by an integrated torque which includes the induction torque generated by the induction current of the conductive bars 151 and a hysteresis torque generated by the magnetic material 160.

Once the speed of the rotor 140 has increased to a predetermined speed, power is supplied to the magnetizing unit 135 for a very short period of time. As a result, the magnetic material 160 may be quickly magnetized. Typically, the current would only be supplied to the magnetizing unit for the time required for the rotor to make 1 to 5 revolutions. After the magnetization of the magnetic material 160, the rotor 140 speed typically increases due to the interaction between a magnetic force of the magnetic material 160 and the rotation magnetic field of the stator coil 121. When the rotor 140 rotates in the higher synchronous speed, the induction current may not slow in the conductive bar 151, thereby the rotor 140 may operate as a synchronous motor rotating at the synchronous speed by the interaction between the magnetic material 160 and the stator 110.

When a motor as described above is used in a compressor of a home appliance, it is capable of being easily started in a home having limited current capacity. The motor described above requires a significantly lower starting voltage than related art motors.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although a number of illustrative embodiments have been described, it should be understood that numerous other modifications and embodiments can be devised by those skilled in the art that will fall within the spirit and scope of the principles of this disclosure. More particularly, various modifications are possible in the component parts and/or arrangements of the subject combinations which would fall within the scope of the disclosure, the drawings and the appended claims. In addition to variations and modifications in the component parts and/or arrangements, alternative uses will also be apparent to those skilled in the art.

What is claimed is:

1. A motor, comprising:
   a stator;
   a rotor mounted inside the stator, the rotor comprising:
      a cylindrical rotor core;
      a magnetic material that surrounds an exterior surface of the cylindrical rotor core such that the magnetic material defines an exterior cylindrical surface of the rotor and a separation air gap "G" is maintained between an exterior surface of the magnetic material and a corresponding interior surface of the stator; and
      a plurality of conductive bars arranged along the circumference of the cylindrical rotor core, wherein a spacing distance "t" is maintained between and outermost tip of the each of the conductive bars and a corresponding interior surface of the magnetic material, and wherein the spacing distance t is greater than the air gap G; and
   a magnetizing unit that can selectively magnetize the magnetic material, wherein the magnetizing unit is mounted adjacent to the exterior cylindrical surface of the rotor, the magnetizing unit comprising:
      a plurality of magnetizing poles each having an end adjacent to the exterior cylindrical surface of the rotor; and
      a corresponding plurality of magnetizing coils each wound around a respective magnetizing pole.

2. The motor of claim 1, wherein the magnetic material has a cylindrical shape.

3. The motor of claim 2, wherein the magnetic material comprises a plurality of bands of material that are mounted on the cylindrical core along the axial direction.

4. The motor of claim 3, wherein the plurality of bands comprises between 3 and 5 bands of magnetic material.

5. The motor of claim 1, wherein the magnetic material comprises a neodymium bonded magnetic material.

6. The motor of claim 1, wherein the air gap G is approximately 0.3 mm, and wherein the spacing distance t is between approximately 0.6 mm and approximately 1.5 mm.

7. The motor of claim 6, wherein the rotor core has a diameter of between approximately 55 mm and approximately 60 mm, and wherein each of the conductive bars has a cross-sectional area of between approximately 21 $mm^2$ and approximately 25 $mm^2$.

8. The motor of claim 7, wherein the plurality of conductive bars comprises between 24 and 30 conductive bars in the rotor.

9. The motor of claim 8, wherein the stator has 24 slots.

10. The motor of claim 1, wherein the separation air gap G and the separation distance t satisfy the formula $2G \leqq t \leqq 6G$.

11. The motor of claim 1, wherein the separation air gap G and the separation distance t satisfy the formula $3G \leqq t \leqq 4G$.

12. A compressor comprising the motor of claim 1.

13. A motor, comprising:
    a stator;
    a rotor mounted inside the stator, the rotor comprising:
       a cylindrical rotor core having a diameter of between approximately 55 mm and approximately 60 mm;
       a magnetic material mounted on an exterior surface of the cylindrical rotor core so as to define an exterior cylindrical surface of the rotor; and
       a plurality of conductive bars arranged along the circumference of the cylindrical rotor core, wherein each of the conductive bars has a cross-sectional area of between approximately 21 $mm^2$ and approximately 25 $mm^2$; and
    a magnetizing unit that can selectively magnetize the magnetic material, wherein the magnetizing unit is mounted adjacent to the exterior cylindrical surface of the rotor, the magnetizing unit comprising:
       a plurality of magnetizing poles each having an end adjacent to the exterior cylindrical surface of the rotor; and
       a corresponding plurality of magnetizing coils each wound around a respective magnetizing pole.

14. The motor of claim 13, wherein the plurality of conductive bars comprises between 24 and 30 conductive bars in the rotor.

15. The motor of claim 14, wherein the stator has 24 slots.

16. The motor of claim 13, wherein the magnetic material comprises a plurality of bands of material that are mounted on the cylindrical core along the axial direction.

17. A compressor comprising the motor of claim 14.

18. A motor, comprising:
    a stator;
    a rotor mounted inside the stator, the rotor comprising:
       a cylindrical rotor core having a diameter of between approximately 55 mm and approximately 60 mm;
       a magnetic material mounted on an exterior surface of the cylindrical rotor core so as to define an exterior cylindrical surface of the rotor; and
       a plurality of conductive bars mounted around the circumference of the cylindrical rotor core, wherein the number of conductive bars is between 24 and 30; and
    a magnetizing unit that can selectively magnetize the magnetic material, wherein the magnetizing unit is mounted adjacent to the exterior cylindrical surface of the rotor, the magnetizing unit comprising:
       a plurality of magnetizing poles each having an end adjacent to the exterior cylindrical surface of the rotor; and
       a corresponding plurality of magnetizing coils each wound around a respective magnetizing pole.

19. The motor of claim 18, wherein the stator has 24 slots.

20. The motor of claim 18, wherein the magnetic material comprises a plurality of bands of material that are mounted on the cylindrical core along the axial direction.

21. A compressor comprising the motor of claim 18.

* * * * *